APPARATUS FOR REMOTELY TESTING TELEPHONE SUBSETS

Filed Dec. 30, 1965 5 Sheets-Sheet 1

INVENTOR.
JOSEPH F. HRIBIK
JOSEPH P. JALLITS
BY
AGENT

INVENTOR.
JOSEPH F. HRIBIK
JOSEPH P. JALLITS

BY

AGENT

Oct. 22, 1968 J. F. HRIBIK ET AL 3,407,274

APPARATUS FOR REMOTELY TESTING TELEPHONE SUBSETS

Filed Dec. 30, 1965 5 Sheets-Sheet 3

INVENTOR.
JOSEPH F. HRIBIK
JOSEPH P. JALLITS

BY

K. McCracken [signature]

AGENT

INVENTOR.
JOSEPH F. HRIBIK
JOSEPH P. JALLITS

BY [signature]
AGENT

Oct. 22, 1968 J. F. HRIBIK ET AL 3,407,274

APPARATUS FOR REMOTELY TESTING TELEPHONE SUBSETS

Filed Dec. 30, 1965 5 Sheets-Sheet 5

INVENTOR.
JOSEPH F. HRIBIK
JOSEPH P. JALLITS

AGENT

United States Patent Office 3,407,274
Patented Oct. 22, 1968

3,407,274

APPARATUS FOR REMOTELY TESTING TELEPHONE SUBSETS

Joseph F. Hribik, Lombard, and Joseph P. Jallits, Elmwood Park, Ill., assignors to Automatic Electric Laboratories, Inc., Northlake, Ill., a corporation of Delaware Filed Dec. 30, 1965, Ser. No. 526,672
11 Claims. (Cl. 179—175.2)

Figure 1:
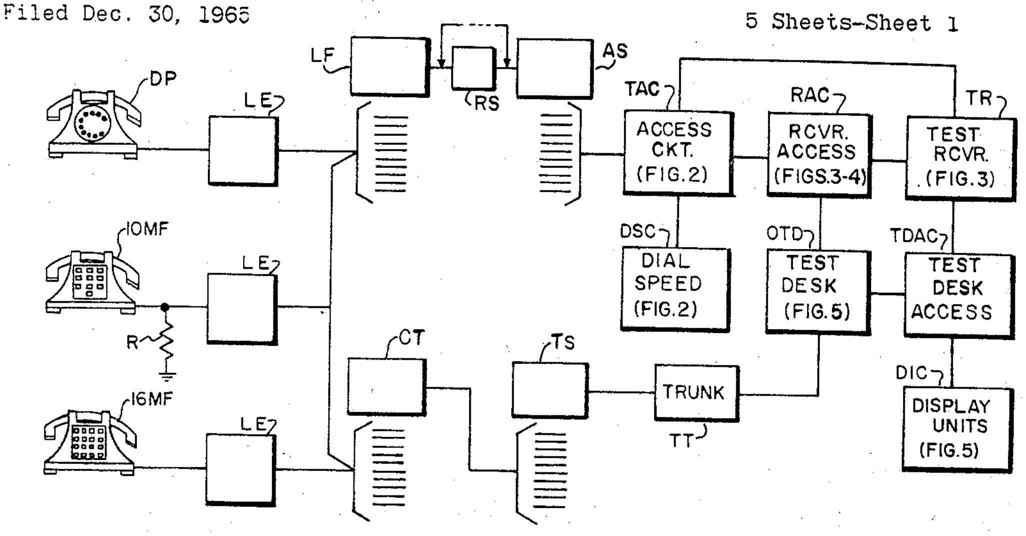

This invention relates to apparatus for testing telephone subsets, and more particularly to apparatus for testing telephone subsets of both the multifrequency and dial pulse signaling types remotely from the central office.

Various arrangements have been devised for testing the pulsing speed and party identity of dial pulse type subsets. The advent of multifrequency signaling, hereinafter called TCMF signaling, has however presented new problems in the area of remote testing of such subsets. In multifrequency signaling systems, wherein the subscriber keys in a directory number also commonly called push-button dialing, a combination of unique two frequency signals are employed to represent the various digits to the central office apparatus. Conventionally, the unique combinations of frequencies are derived from a four by four arrangement of frequencies comprising four high frequencies and four low frequencies for a total of 16 unique combinations. Basically, ten digits are used for subscriber signaling, the additional digits being available for special services. Therefore, test apparatus must be capable of testing the various types of subsets of ten or more digits.

While the telephone field is almost completely automatic, it will be some time before multifrequency subsets substantially replace conventional dial pulse type subscriber subsets. Therefore, test apparatus must be capable of accommodating both dial pulse and multifrequency types of subsets.

The best operational test of the subset should be made in its operating environment; therefore, the necessity of testing each digit as a possible first-dialed directory number digit in the presence of the dial tone is one of the new problems encountered. One type of testing apparatus is described in the October 1963 issue of The Bell Laboratories Record. This apparatus provides for verification of all digits of a subset, but not for each digit of the subset.

Another problem arises in the area of party identification wherein some verification must be provided to an installer to indicate that the subset has been correctly connected for party ringing. The above test equipment does not provide a party identification test for TCMF subsets.

It is a primary object of the present invention to provide new and improved techniques for remotely testing subscriber subsets.

It is another object of the invention to provide new and improved apparatus for remotely testing and supplying verification signals, upon receipt of each digit of a subscriber substation and upon receipt of a full complement of digits.

One feature of the present invention resides in the provision of dial tone during the digit verification test and means for momentarily interrupting said dial tone upon registration of each digit as a verification that the dialed digit is properly registered.

Another feature of the invention resides in the provision of apparatus for automatically conditioning the testing circuits to the type of subset which is requesting service. That is, no additional digits are required after access of the test circuit to indicate that a dial pulse subset or a 10, 12 or 16 digit TCMF subset is requesting service.

Another feature of the invention resides in the provision of apparatus for supplying to the tested subset, a unique verification tone indicative of proper party identification.

Figure 6:
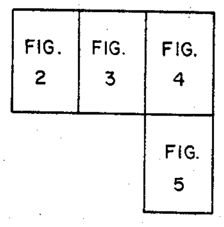

Other objects and features of the invention become apparent and the invention will best be understood from the following description taken in conjunction with the accompanying drawings in which:

FIG. 1 is a schematic diagram of the invention in the environment of a step-by-step type telephone exchange;

FIGS. 2, 3, 4, and 5 together form a schematic diagram of the invention;

FIG. 6, shown on the same drawing with FIG. 1, describes the proper orientation of FIGS. 2 to 5.

*General description*

FIG. 1 describes various connections which can be set up between either a dial pulse subset or a multifrequency subset to the subset test apparatus. One of these connections utilizes the selector access method while the other connection is set up via test selectors and connectors to the subscriber's subset. The first method of access is via an access selector AS (and linefinder LF and register-sender RS or the linefinder and switch train symbolized by the broken line shunting the register-sender) to a test access circuit TAC which controls connection of the subset to either the dial pulse or tone testing equipment. A dial pulse call will be connected through the circuit TAC to the dial speed testing circuit DSC. A multifrequency subset will be connected through circuit TAC to the receiver access and party identification circuit RAC and to the test receiver TR. A test desk operator may monitor such a call by way of test desk OTD and the test desk access circuit TDAC, and in addition to an audible monitor, can receive a visual display at circuit DIC. The second method of access is initiated by the test operator from test desk OTD to the suspected faulty subset by way of a test trunk TT, a test selector TS and a test connector CT. Other exchange equipments have not been shown since they may comprise any of various well known arrangements.

Figure 2:
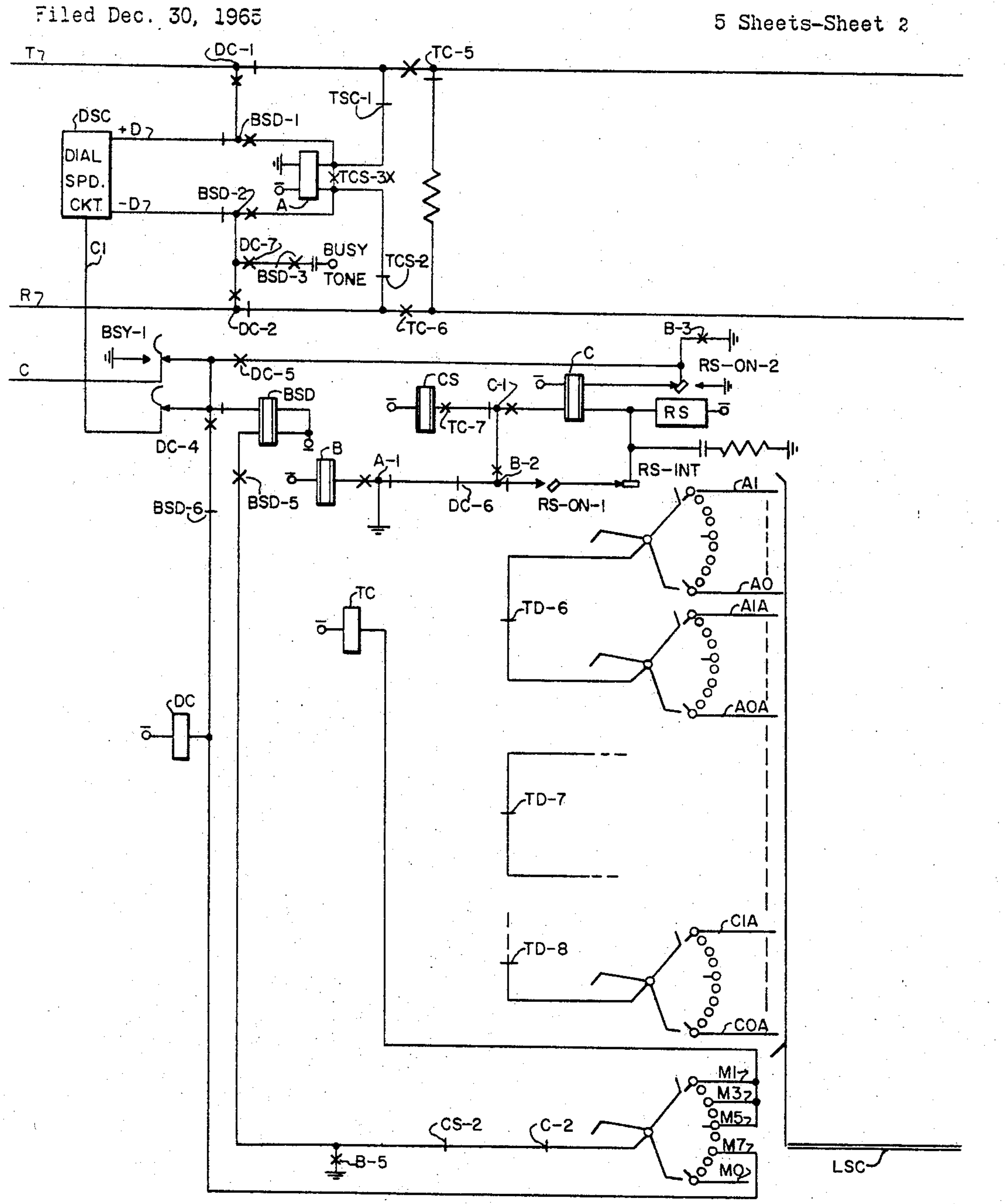

FIG. 2 describes the test access circuit TAC and includes apparatus for some conventional step office functions such as relays A, B, and C for the well known A–B–C operation. Rotary switch RS is stepped to automatically condition the test circuit for the type of subset which is requesting service. Also shown in FIG. 2 in block form is the dial speed circuit DSC which may be any well known dial speed checking and party identification circuit.

Figure 3:
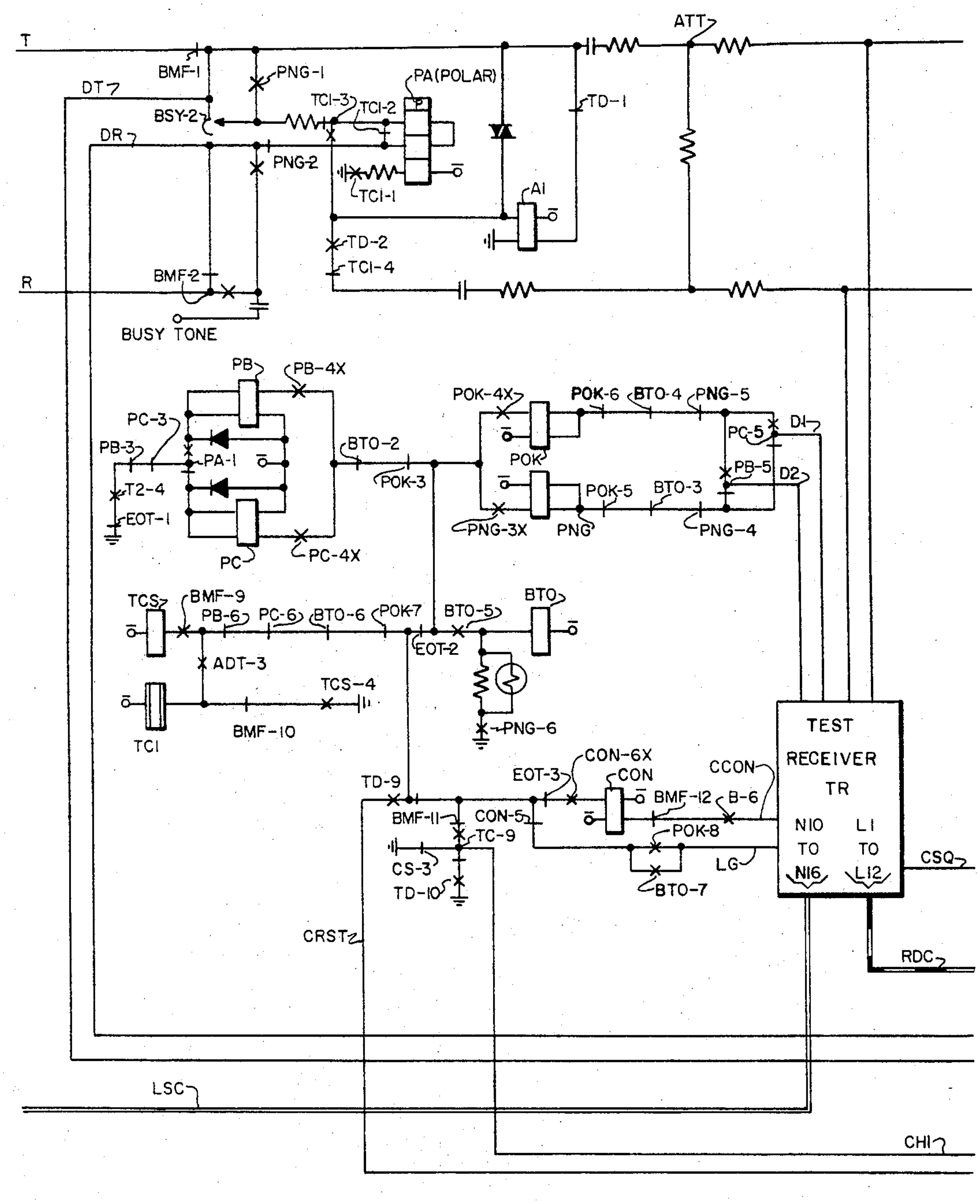
Figure 4:
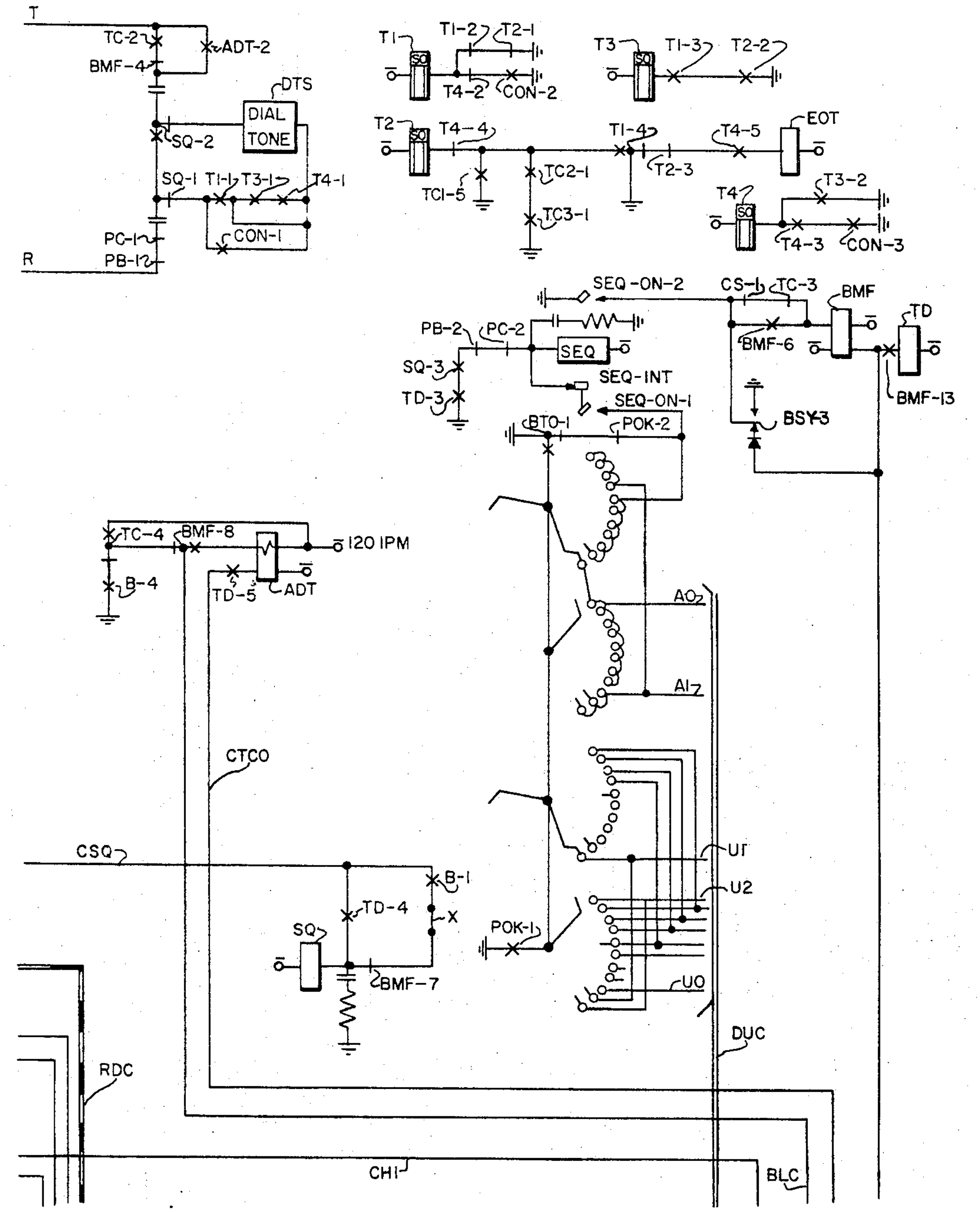

FIGS. 3 and 4 describe the receiver access and party identification circuit for multifrequency subsets comprising a polar relay PA for detecting party identification, and a series of relays T1 to T4 and EOT which control the transmission of vertification tones to the calling subset. Rotor switch SEQ determines the visual indication provided in the display circuit DIC. Shown in block form of FIG. 3 is the test receiver TR which will be further functionally described below, and which may comprise apparatus such as disclosed in the United States patent application of R. V. Burns et al., entitled "Timing Arrangement for Multifrequency Signal Receivers," Ser. No. 318,909, filed Oct. 25, 1963, now United States Patent No. 3,284,577, issued Nov. 8, 1966.

Figure 5:
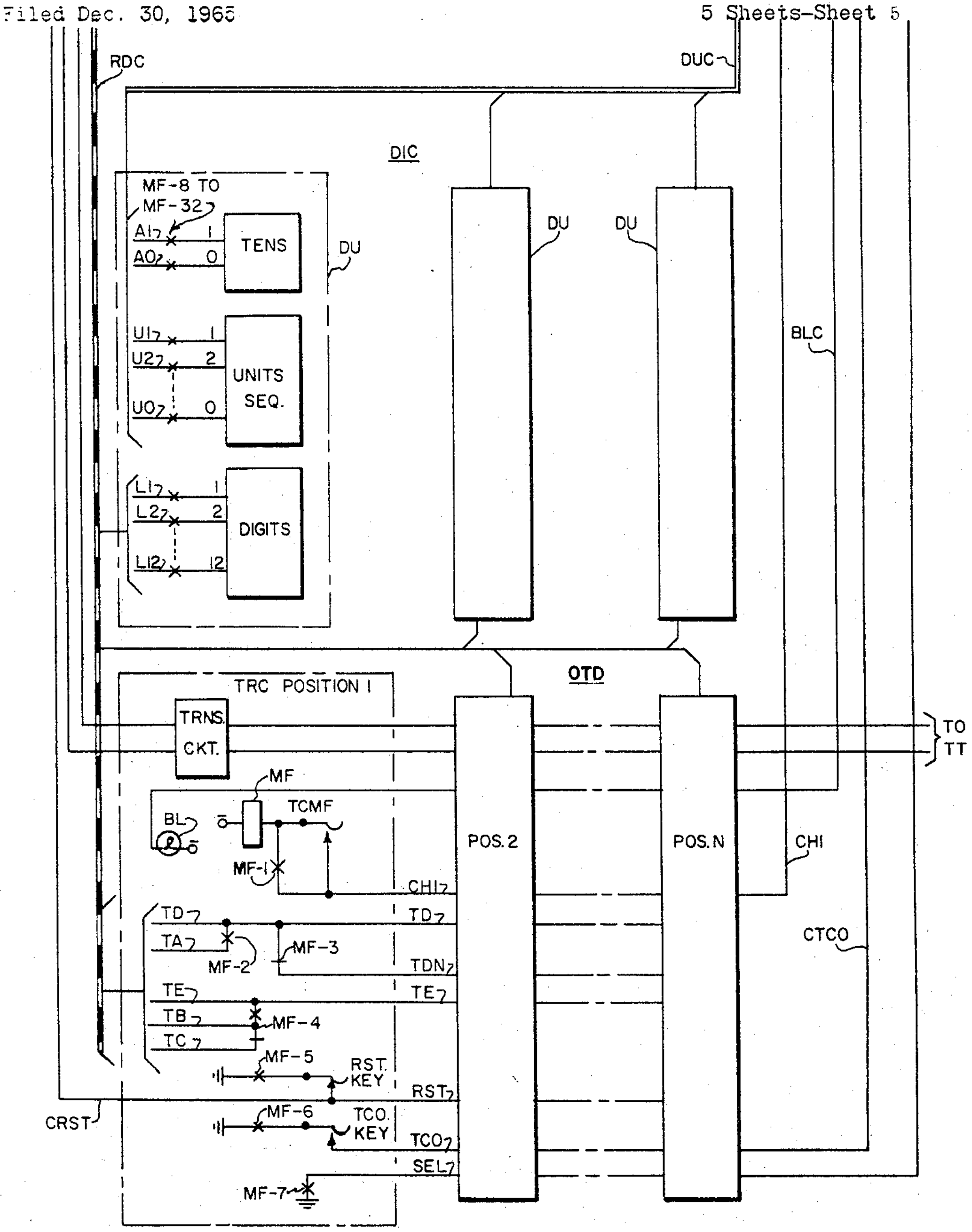

FIG. 5 describes relevant portions of the test desk operators' positions and associated display circuits OTD and DIC, respectively. Each test operator's equipment comprises a busy lamp BL, a TCMF key to condition the position for operation, a reset key RST to condition the circuit for retesting and a transmission cutoff key TCO to cut off the operator's transmisson (not shown) so that the line may be audibly monitored with a portion of the transmission circuit.

*Test receiver*

The test receiver TR as mentioned above may be of any of the well known types; however, it is preferable that such a receiver be more critical in the frequency tolerance to insure proper operation of a subset in its normal operating environment. Furthermore, since it is most advantageous to use a simple relay chain to register the received frequencies, there is no problem of double digit registration as discussed in the above Burns et al. patent application and there is no need for a timing arrangement to ignore double digit registration. The test receiver should though furnish certain marks to the test circuit as follows:

SQ—Indicates receipt of any low frequency.

CON—Indicates that all digits have been registered in sequence.

N10—Indicates digit 10 has been registered.

N11—Indicates digit 11 has been registered.

N12—Indicates digit 12 has been registered.

N13—Indicates that digit 13 has been registered.

N14—Indicates that digit 14 has been registered.

N15—Indicates that digit 15 has been registered.

N16—Indicates that digit 16 has been registered.

LG—Indicates that any of the marks L1 to L12 are provided.

L1—Indicates that digit 1 or digit 14 has been registered.

L2—Indicates that digit 2 or digit 15 has been registered.

L3—Indicates that digit 3 or digit 16 has been registered.

L4—Indicates that digit 4 has been registered.

L5—Indicates that digit 5 has been registered.

L6—Indicates that digit 6 has been registered.

L7—Indicates that digit 7 has been registered.

L8—Indicates that digit 8 has been registered.

L9—Indicates that digit 9 or digit 12 has been registered.

L10—Indicates that digit 10 or digit 13 has been registered.

L11—Indicates that digit 13 or digit 14 or digit 15 or digit 16 has been registered.

L12—Indicates that digit 11 or digit 12 has been registered.

D1—Indicates that digit 1 has been registered.

D2—Indicates that digit 2 has been registered.

The appearances of any of the above L1 to L12 marks conditions the test receiver to register any digit independently of the sequence of reception.

*Operational description*

In the following description of operation, "X" contacts of relays are indicated by the suffix X (i.e., TCS–3X).

Referring for a moment to FIG. 1 assume that a dial pulse type subset has been connected to the circuit via an access selector AS. Normally upon installation an installer-repairman will employ the selector level access method and test the subset, while the test operator will establish a connection to a suspected faulty subset and inform the subscriber of the test; therefore the subset will be hereinafter referred to as the calling or called party. Referring now to FIGS. 2–5, once the test circuit has a closed loop presented at conductors T and R when accessed either through a register sender or a step-by-step switch train to operate relay A, contacts A–1, close providing operating ground to relay B, which closes contacts B–3 to operate relay C via contacts RS–ON–2, the well known A–B–C relay operation. Relays B and C are of the type which are slow to release on momentary interruptions of their powering paths. Contact C–1 transfers to prepare a path to operate rotary switch RS. The last digit, which would be obtained from the translation when a register sender RS is accessed, or the last digit dialed directly through a switch train (broken line of FIG. 1), positions rotary switch RS for dial pulse access, which in this case is the digit 7 repeated by relay A. The alternate opening and closing of contacts A–1 connect operating ground to the rotary switch via contacts DC–6, B–2, C–1 and relay C. The rotary switch is stepped to position 7 and ground is connected through contacts B–5, CS–2, C–2 and rotary switch level M position 7 to operate relay DC which transfers conductors T and R to the dial speed checking circuit via contacts DC–1, BSD–1, DC–2 and BSD–2. Contacts DC–5 and DC–4 operate to connect ground from contacts B–3 and B–5 respectively, through to conductor C–1 into the dial speed checking circuit. In one working test circuit dial speed is compared with a built in 10 p.p.s. generator. If the dial speed is slow, one burst of tone is returned, if normal two bursts are returned, and if fast three bursts of tone are returned. Dial tone is extended back to the calling line from the dial speed checking circuit. Dial speed is now checked in the well known manner by dialing preferably the digit zero and the party identity is checked by dialing a party identity digit into the dial speed checking circuit.

When the dial pulse testing portion of the test circuit is accessed, the busy lamp BL in FIG. 5 will glow brightly. Tracing back the circuit including the lamp BL, conductor BLC, contacts BMF–8 and B–4 to indicate to the test positions that the dial portions of the circuit has been seized. When this condition is encountered, the test desk can access the TCMF portion of the circuit and conduct TCMF tests through the test board.

The dial speed portion of the circuit may be manually busied by operating key BSY–1 of FIG. 2. Upon access of the circuit and a A–B–C–DC relay operation no dial is returned to the calling party since a ground mark from circuit operates relay BSD which at contact BSD–1, BSD–2, and BSD–3 remove the inputs to circuit DSC and return the busy tone to the line via contacts BSD–3, DC–7 and DC–2.

*TCMF subset access*

Referring to FIGS. 2–5, each type of TCMF subset (10–12 or 16 pushbutton) employed in any given central office is assigned a specific access code. This access code is keyed perhaps into a register sender, and the resulting (routing) information will permit access to the test circuit. The last digit of said information will position rotary switch RS to the proper position to indicate to the test receiver the type of TCMF subset requesting this service. Upon access and a closed loop through the TR conductors, relays A–B–C operate as previously described as step rotary switch to say position 1, the digit 1 being the last translation digit from the register sender. Relay TC operates over the connection including contacts B–5, CS–2, C–2 and level M of rotary switch RS. The terminals of the other levels are rotary switch RS strapped to the terminals N–10 to N–16 of the test receiver TR indicated by cable LSC. If for example, a 10 pushbutton subset is to be tested, and the routing digit is a one, the levels would be strapped upon installation to connect terminals A1 to N10 and A1A to N16. This strapping arrangement is based on each TCMF subset having a full complement of 16 pushbuttons. When a 16 pushbutton TCMF instrument accesses the circuit, no strapping is required between levels of switch RS and terminals N10 to N16. The test receiver circuit normally accepts the full complement of 16 digits. For subsets that do not utilize the full complement of 16 pushbuttons, the test receiver is conditioned via strapping of the levels of rotary switch RS to bypass the missing pushbuttons. As another example, if the routing digit is a three, terminal A3 would be connected to N12 and A3A to N16.

Once the A, B and C relays, switch RS and relay TC perform their functions, balanced dial tone is returned to the calling subset via contacts SQ–2, BMF–4, TC–2, the attenuator ATT, contacts TC–5, DC–1, T1–1 (normally closed), SQ–1, PC–1, PB–1, ATT, TC1–4, TD–2, TC1–3, TC1–2, PNG–2, BMF–2, TC–6 and DC–2. Relay TCS has been operated over the path including ground contacts CS–3, TC–9, BMF–11, TD–9, POK–7, BTO–6, PC–6, PB–6 and BMF–9. In operating, the contacts TCS–3X, TCS–1 and TCS–2 remove relay A from the line and hold it operated from its own battery and ground connections. Relay TC1 is operated by ground through contacts TCS–4 and BMF–10 to place two windings of polar relay PA across the line by contacts TC1–2 and TC1–3 to condition the test apparatus for party registration. Contacts TC1–1 provide power to the third winding of relay PA. Contacts TC1–5 close to operate relay T2 via contacts T4–4. Relay T1 restores to remove dial tone during the party identity test. If the calling line is a private line or party one of the line, and no mark is supplied from the subset, relay PA does not operate and relay PC will operate via contacts EOT–1, T2–4, PB–3, PC–3 and PA–1. If party two (resistance ground on conductor T) symbolized by the resistance ground R at subset 10MF is requesting service, relay PA operates and in turn operates relay PB rather than relay PC due to the transfer at contacts PA–1. In either case, operation of relay PB or PC restores relay TCS at contacts PB–6 or PC–6 which in turn restores relay TC1 by opening contacts TCS–4. Relay T2 is then restored by the opening of contacts TC1–5. (Relay T1 due to the slow acting feature maintains its operation to keep dial tone off the line until relay PB or PC operates.) Relay PB or PC as the case may be, however, is locked via its contacts PB–4X or PC–4X to the ground circuit provided for relay TCS via contacts BTO–2, POK–3, EOT–2, TD–9, BMF–11, TC–9 and CS–3.

During the party identification test, the dial tone is removed from the line by virtue of opening contacts PB–1 or PC–1. The calling party keys in the party identity digit (in this case digit 1 or digit 2) and if proper registration occurs, a mark will so indicate on conductors D1 and D2 from the test receiver to operate relay POK via contacts PB–5 or PC–5, PNG–5, BTO–4 and POK–6 sufficiently to operate its contacts POK–4X to supply ground via aforementioned connection (ground via CS–3) to fully operate relay POK and open the last-mentioned connection at contacts POK–6. Contacts POK–3 open to restore the operated PB or PC relay which reapplies dial tone to the line or contacts PC–1 or PB–1 to indicate proper party registration to the calling party.

If the proper party registration did not occur, that is the marks on conductors D1 and D2 did not agree with the operation of relay PB or PC at contacts PB–5 and PC–6 to operate relay POK, relay PNG will be operated via contacts PB–5 or PC–5 at contacts PNG–4, BTO–3 and POK–5. Relay PNG operates sufficiently to close contacts PNG–3X, and in a manner similar to relay POK, operates fully to restore relay PB or PC as the case may be. However, instead of immediately returning dial tone to the calling party, which would indicate a valid party registration, busy tone is returned for a few seconds by virtue of the closure of contacts PNG–1, PNG–2 and PNG–6. Contacts PNG–1 and PNG–2 prevent dial tone from being returned and instead connect busy tone to the line until relay BTO operates due to the closure of contacts PNG–6. Operation of relay BTO opens contacts BTO–3 to restore relay PNG and replace busy tone with dial tone. The calling party will then operate the hookswitch to open the loop and reaccess the tone circuit as previously described to retest and confirm that the proper party registration and identification was not made. If the calling party is an installer, he may modify his subscriber connections and retest the subset.

Upon receiving the dial tone indication that party identification is proper, each digit of the subset is keyed into the test receiver. The test apparatus as shown is adapted to give a verification of receipt of each digit dialed by the X strapping on the ground side of relay SQ. During receipt of each digit, the ground mark is momentarily applied to conductor CSQ to momentarily operate relay SQ via contacts D–1, strap S, and contacts BMF–7. The momentary operation of relay SQ momentarily interrupts dial tone at contacts SQ–1 and SQ–2. Upon registration of the final digit according to the access code positioning of switch RS, a mark is placed by the test receiver TR on conductor CCON to operate relay CON via contacts B–6 and BMF–12. Contacts CON–6X close to hold relay CON operated over the previously traced ground circuit from contacts CS–3. Contacts CON–2 close ground via contacts T4–2 to operate relay T1 which in turn operates contacts T1–4 to transfer ground through contacts T4–4 to T2. Relay T2 contacts T2–2 close to supply ground to relay T3 via contacts T1–3. Contacts T3–2 close ground to operate relay T4 which holds via contacts T4–3 and CON–3 and in turn opens contacts T4–2 to restore relay T1. Relay T1 in turn transfers ground from relay T2 to relay EOT via contacts T1–4, T2–3 and T4–5 to operate relay EOT. Contacts EOT–3 operate to release relay CON. The foregoing chain operation provides a "zip-zip-zop" tone to the calling subset to indicate proper registration due to the opening and closing of contacts T1–1, T3–1, T4–1 and CON–1 at the output of the dial tone source DTS. Operation of relay EOT returns the circuit to normal and the test may be repeated.

If the digits were not properly detected by the test receiver no "zip" tone would be returned to the TCMF subset. The calling party may repeat the cycle by momentarily operating the hookswitch to open the loop to restore relay A and operate relay CS via contacts A–1, DC–6, B–2, C–1 and TC–7. Relay CS in operating removes the locking ground in FIG. 3 at contacts CS–3 and opens the circuit to relay TC at contact CS–2. Relay TC restores causing relay A to reoperate and restore relay CS by transferring ground at contacts A–1 from the CS circuit to relay B. Contact CS–2 again close to operate relay TC and the circuit is again conditioned for retesting.

When the tone detection portion of the apparatus is accessed via a selector level, busy supervision is returned to the test desk from the 120 i.p.m. source via contacts TC–4 and BMF–8 to the lamp BL of the test positions. This provides a bright flashing of the BL lamp. This will indicate to the test positions that the TCMF portion of this circuit is selector level accessed. The test desk operator may audibly and visually monitor a call by operating the key TCMF at the test position via the transmission circuit TRC. Seizure of the TCMF circuit by the test desk in this condition is prevented due to the circuit being open to the circuit BMF by the contacts TC–3 of operated relay TC.

*Test desk access*

FIG. 1 describes how a test desk operator may access a suspected faulty subset over a test trunk and test selector and connector circuits. Specific circuits for accomplishing such a connection and specific transmission sets for audible monitoring are not described herein. Access may be made from the test board outgoing to a subscriber over apparatus such as just mentioned or incoming over an inspector's trunk (not shown). In either case, the test circuit is accessed by operating the TCMF key located at a test position. A chain circuit is employed to prevent multiposition access. When accessed, relay MF operates over the ground supplied to the test positions on conductor CH1 via contacts CS–3 and TC–9. Relay MF in operating opens the chain circuit to prevent multiposition access and via contact MF–7 provides operating ground to relay BMF. Relay BMF in operating contacts BMF–1 and BMF–2 removes the access circuit of FIG. 2 from the remainder of the test equipment. Busy tone is extended to any probable selector level access at BMF–2 and the test position is connected to the dial tone portion of the circuit via PNG–2, TC1–2 and TC1–3. Contacts BMF–13 close operating ground via contacts MF–7 to operate relay TD. Relay TD in operating prepares the circuit for sequencing upon receipt of digits from the subset to be tested.

At the test desk OTD, the test operator operates the transmitter cutoff TCO key to operate relay ADT with ground via contacts MF–6, key TCO, conductor TDCO and contacts TD–5. Relay ADT operates and closes contacts ADT–3 to operate relay TC1 via the normally closed key RST and conductor CRST. To cycle the party identification portion of the circuit as previously described, including relays PB, PC, POK and PNG which determine proper party identification as previously described. Again relays PB or PC operate to restore TC1 by opening contacts PB–6 or PC–6. The TCO key is restored which releases relay ADT and the test operator instructs the called party to depress the party identity digit. The operator again operates the TCO key, relay ADT operates, the called party depresses the button 1 or 2 and relay POK or BTO operates as previously described. With relay POK or BTO operating to restore relay PB or PC the test receiver operates relay SQ to step rotary switch SEQ and provide grounds via contacts POK–1 or BTO–1 to the display units DU via cable DUC. Contacts MF8 to MF32 have closed the circuit to the lamps of the display unit. Cable RDC connects L outputs of the receiver to the display units to indicate which digit is being received, while outputs U1 to U0 and A0 to A1 indicate the sequence (1–16) in which the digits are received.

The test operator then instructs the called party to operate each of his pushbuttons. Upon each operation of the pushbuttons, the numerical equivalent will be displayed in apparatus DU and the sequence in which they appeared will be displayed. Upon the receipt of each digit, relay SQ will operate as previously described from the momentary ground mark placed on conductor CSQ via contact TD–4. Momentary operation of relay SQ causes stepping of rotary switch SEQ due to the opening and closing of contacts SQ–3.

When the tone circuits are accessed by the test desk, the circuit may be reset to retest the TCMF subset by operating the key RST which removes holding ground from the conductor RST to the circuitry of relays BTO and POK. Release of relays BTO or POK cause the sequence switch to home via contacts BTO–1, POK–2, SEQ–ON–1, and SEQ–INT contacts. When the rotary switch SEQ first stepped, it provided a holding ground for relay BMF via contacts SEQ–ON–2 and BMF–6. Once the circuit has returned to normal, the party detection may be once again initiated by operation of key TCO.

When the circuit is accessed by the test desk, a 120 i.p.m. flashing via lamp is an indication to the other testing positions that the circuit is in use. This is due to the 120 i.p.m. supply being provided to the BL lamp via a noninductive winding of relay ADT and contacts BMF–8. In this condition, FIG. 2 may be utilized for dial speed or party identity test since the contacts TC–5 and TC–6 isolate the dial pulse and tone portions of the circuit. If the TCMF portion of the circuit is accessed, busy tone will be returned to the calling party via operated contacts BMF–1 and BMF–2.

Many changes and modifications may be made in the invention by one skilled in the art without departing from the true spirit and scope thereof and should be included in the appended claims.

What is claimed is:

1. In a telephone system comprising a subscriber subset including a multifrequency signaling device operable to generate digit signals, each of said digit signals comprising a unique frequency combination, apparatus for testing operating characteristics of said subset, said apparatus having an access code comprising a plurality of said digits and switching equipment for interconnecting said apparatus and said subset upon receipt of digit signals forming said access code, the improvement comprising: a tone source in said test apparatus having an output coupled to said subset via said switching equipment; and signal verification means in said test apparatus operated to momentarily interrupt said tone source output in response to the receipt of a digit signal as a verification of the validity of said digit.

2. The improvement in a telephone system according to claim 1, said telephone system further including a plurality of subscriber subsets, each of said subsets including a multifrequency signaling device having a different complement of digits, a portion of said access code being different for each one of said subsets and identifying the digit complement of said subsets, and wherein said test apparatus further comprises means operated in response to said complement identifying portion of said access code to condition said signal verification means to the appropriate digit complement of a subset requesting service, said signal verification means comprising means operated to provide a plurality of momentary interruptions of said tone source output in response to the receipt of a full complement digit signals.

3. The improvement in a telephone system according to claim 1, said telephone system including another subscriber subset including a dial pulse generating calling device, and a portion of said access code identifying the type of calling device of the subset requesting service, said testing apparatus comprising dial pulse testing means and means operated in response to said portion of said access code digit signal to couple said dial pulse subset to said dial pulse testing means.

4. Apparatus according to claim 1, wherein said subset is provided in circuit with a party identification mark and is assigned a party identification digit, said test apparatus comprising means for determining the provision of said mark, means included in said verification means for identifying signals corresponding to said party identification digit, means for comparing said mark and said signals, and means for signaling the results of said comparison to said subset.

5. Telephone apparatus comprising: an operator's test position including a plurality of display means; a subscriber subset including a multifrequency signaling device; apparatus for interconnecting said test position and said subscriber subset; subset testing apparatus coupled to said subscriber subset via said test position and said interconnecting apparatus; a source of tone in said test apparatus; means in said test apparatus for providing a first output upon receipt of each different one of said digits, a second output upon receipt of a full complement of said digits, and a plurality of third outputs, each of said third outputs identifying a digit received and coupled to a first portion of said display means; means in said test apparatus operated by said first output to momentarily interrupt said tone; means in said test apparatus operated by said second output to interrupt said tone a unique plurality of times; and means in said test apparatus and operated by said momentary interrupting means to sequentially energize a second portion of said display means to indicate the sequence in which said digits are received.

6. In a telephone system, a plurality of telephone subsets, each of said subsets including a multifrequency calling device, each of said calling devices having a different digit complement from the other said calling devices, apparatus for testing the operation of said calling devices, said test apparatus having an access code, a first portion of said access code being common for all said subsets and different second portions being individual to and identifying a different digit complement, switching means for interconnecting a calling one of said subsets and said test apparatus according to said first portion of said access code, means in said test apparatus for receiving and varifying digit signals from said calling subset, said receiving and verification means being conditioned in response to a second portion of said access code to receive the digit complement corresponding to said calling subset, and means operated by said receiving and verification means to provide to said calling subset verification signals upon the receipt of each digit of said corresponding complement and upon receipt of all digits of said corresponding complement.

7. The combination according to claim 6, comprising at least one subset including a calling device of the dial pulse type, another second portion of said access code identifying dial pulse type calling devices, means for testing the operation of dial pulse type calling devices, and means operated in response to said second portion of said access code to couple a calling one of said subsets to said receiving and verifying means or to said dial pulse testing means.

8. The combination according to claim 6, wherein at least one of said subsets is provided with a party identification mark and assigned a party identification digit, and comprising in said test apparatus means for detecting the presence of said mark, means operated by said receiving and verification means upon the receipt of said party identification digit from a calling one of said subsets to compare said mark with said party identification digit, and means operated by said comparison means to signal to said calling subset a first signal indicative of agreement between said mark and said identification digit or a second signal indicative of disagreement between said mark and said identification digit.

9. The combination according to claim 6, comprising an operator's test position for monitoring a subset test, said test position including first visual display means coupled to and controlled by said receiving and verification means to display signals corresponding to received digit signals, second visual display means for displaying signals according to the sequence in which said digit signals are received, and sequence means for operating said second display means, said sequence means coupled to and controlled by said verification signal providing means.

10. The combination according to claim 6, comprising an operator's test position coupled to said test apparatus including means at said test position for selectively establishing a connection to any of said subsets, and means controlled by said receiving and verifying means for monitoring the receipt of digit signals.

11. In a telephone system, a plurality of telephone subsets, said subsets including different types of calling devices each operable to generate digit signals, apparatus for testing the operation of said calling devices, means for seizing said apparatus by dialing from a calling one of said subsets an access code comprising a plurality of said digits, at least a number of said last-mentioned digits identifying the type of calling device used, and means in said test apparatus operated in accordance with the access code dialed in seizing said apparatus for automatically conditioning said apparatus for testing a calling device of the type used in said calling subset.

No references cited.

KATHLEEN H. CLAFFY, *Primary Examiner.*

A. McGILL, *Assistant Examiner.*